(12) United States Patent
Yuan et al.

(10) Patent No.: US 12,047,217 B2
(45) Date of Patent: Jul. 23, 2024

(54) CONTENTION-BASED PAYLOAD TRANSMISSIONS USING DIFFERENTIAL CODING

(71) Applicant: ZTE Corporation, Guangdong (CN)

(72) Inventors: Zhifeng Yuan, Guangdong (CN);
Yuzhou Hu, Guangdong (CN);
Jianqiang Dai, Guangdong (CN);
Weimin Li, Guangdong (CN); Jian Li, Guangdong (CN); Qiujin Guo, Guangdong (CN); Hong Tang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 254 days.

(21) Appl. No.: 17/373,033

(22) Filed: Jul. 12, 2021

(65) Prior Publication Data

US 2021/0345417 A1 Nov. 4, 2021

Related U.S. Application Data

(63) Continuation of application No. PCT/CN2019/071485, filed on Jan. 11, 2019.

(51) Int. Cl.
*H04L 27/26* (2006.01)
*H04L 5/00* (2006.01)
(Continued)

(52) U.S. Cl.
CPC .......... *H04L 27/2634* (2013.01); *H04L 27/04* (2013.01); *H04L 27/20* (2013.01);
(Continued)

(58) Field of Classification Search
CPC ....... H04L 27/264; H04L 27/04; H04L 27/20; H04L 27/2601; H04L 27/34
See application file for complete search history.

(56) References Cited

U.S. PATENT DOCUMENTS 5,754,600 A * 5/1998 Rahnema ........... H04B 7/18532
714/795
9,949,298 B1 * 4/2018 Akoum ................ H04B 7/0695
(Continued)

FOREIGN PATENT DOCUMENTS

| CN | 104902486 A | 9/2015 |
| CN | 107079382 A | 8/2017 |

(Continued)

OTHER PUBLICATIONS

EPO, Communication pursuant to Article 94(3) for European Patent Application No. 19849396.7, mailed on Mar. 10, 2023, 5 pages.
(Continued)

*Primary Examiner* — Mohammad S Anwar
(74) *Attorney, Agent, or Firm* — Perkins Coie LLP

(57) ABSTRACT

Methods, systems, and devices for contention-based transmissions using differential coding techniques in mobile communication technology are described. An exemplary method for wireless communication includes transmitting, by a wireless device, a payload that comprises an identity of the wireless device and at least one of a user plane data or a control plane data, where the payload is modulated using a differential coding technique. Another exemplary method for wireless communication includes receiving, by a network node, a payload that comprises an identity of the wireless device and at least one of a user plane data or a control plane data, where the payload is modulated using a differential coding technique.

20 Claims, 11 Drawing Sheets

800

810 — Transmitting, by a wireless device, a payload that comprises an identity of the wireless device and at least one of a user plane data or a control plane data, wherein the payload is modulated using a differential coding technique

(51) Int. Cl.
*H04L 27/04* (2006.01)
*H04L 27/20* (2006.01)
*H04L 27/34* (2006.01)
*H04W 74/0833* (2024.01)

(52) U.S. Cl.
CPC .......... *H04L 27/2601* (2013.01); *H04L 27/34* (2013.01); *H04W 74/0833* (2013.01); *H04L 5/0048* (2013.01); *H04L 5/0051* (2013.01)

(56) References Cited

U.S. PATENT DOCUMENTS

| | | | |
|---|---|---|---|
| 2008/0159246 A1 | 7/2008 | Niemela | |
| 2008/0320104 A1 | 12/2008 | Turner et al. | |
| 2013/0101063 A1* | 4/2013 | Jiang | H04L 25/0228 375/285 |
| 2016/0285526 A1* | 9/2016 | Hedayat | H04L 5/0094 |
| 2018/0097591 A1* | 4/2018 | Islam | H04W 72/30 |
| 2018/0098359 A1* | 4/2018 | Patel | H04L 5/0048 |
| 2018/0254980 A1 | 9/2018 | Kelley | |

FOREIGN PATENT DOCUMENTS

| | | | | |
|---|---|---|---|---|
| GB | 2510657 A | * | 8/2014 | ............. H04B 1/707 |
| JP | 0734132 A2 | * | 9/1996 | ............... H04L 5/06 |
| WO | 2016/048051 A1 | | 3/2016 | |
| WO | 2017/200562 A1 | | 11/2017 | |

OTHER PUBLICATIONS

European Search Report for EP Patent Application No. 19849396.7, dated Dec. 13, 2021 (10 pages).
International Search Report and Written Opinion mailed on Sep. 30, 2019 for International Application No. PCT/CN2019/071485, filed on Jan. 11, 2019 (7 pages).
CNIPA, First Office Action for Chinese Application No. 201980088758. 6, mailed on Oct. 28, 2023, 10 pages with unofficial English translation.
CNIPA, Notification to Complete Formalities of Registration for Chinese Application No. 201980088758.6, mailed on Mar. 12, 2024, 7 pages with unofficial English translation.

* cited by examiner

CONTENTION-BASED PAYLOAD TRANSMISSIONS USING DIFFERENTIAL CODING

CROSS-REFERENCE TO RELATED APPLICATIONS

This application is a continuation of International Patent Application No. PCT/CN2019/071485, filed on Jan. 11, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement contention-based transmissions using differential coding techniques.

SUMMARY

This document relates to methods, systems, and devices for generating transmit symbols in mobile communication technology, including 5th Generation (5G) and New Radio (NR) communication systems.

In one exemplary aspect, a wireless communication method is disclosed. The method includes transmitting, by a wireless device, a payload that comprises an identity of the wireless device and at least one of a user plane data or a control plane data, where the payload is modulated using a differential coding technique.

In another exemplary aspect, a wireless communication method is disclosed. The method includes receiving, by a network node, a payload that comprises an identity of the wireless device and at least one of a user plane data or a control plane data, where the payload is modulated using a differential coding technique.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

There is an increasing demand for fourth-generation of mobile communication technology (4G), Long-Term Evolution (LTE), Advanced LTE (LTE-Advanced/LTE-A, Long-Term Evolution Advanced) and fifth-generation mobile communication technology (5G), including New Radio (NR) implementations. From the current development trend, 4G and 5G systems are studying the characteristics of supporting enhanced mobile broadband, ultra-high reliability, ultra-low latency transmission, and massive connectivity.

In the developing 5G NR implementation, a one-shot/contention-based uplink payload transmission (in inactive or idle state) is being discussed as an improvement over data transmission in RRC connected state, since it enables a simplified uplink data transmission procedure, power savings and reduced latency. With regard to the UE, the transmission would be pool-based in that the UE would randomly select, as part of the one-shot/contention-based uplink payload transmission, a reference signal (RS) from within a preconfigured pool. An RS collision (which results when multiple UEs happen to select the same RS) may lead to inaccurate channel estimation and degraded demodulation and decoding performance.

Figure 1:
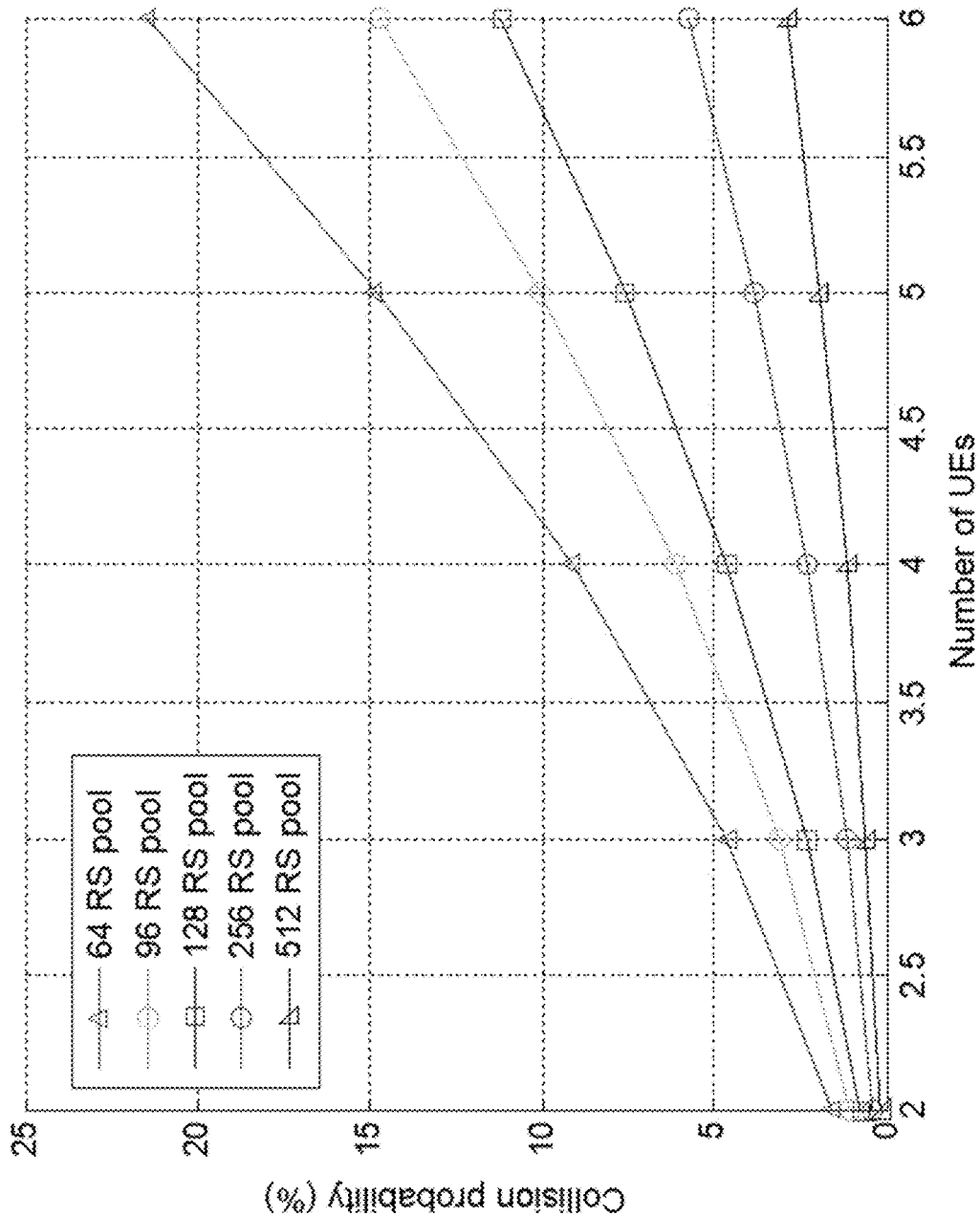
FIG. 1 shows an exemplary plot of collision probability as a function of the number of wireless devices for different reference signal (RS) pool sizes.

In one-shot/contention-based physical uplink shared channel (PUSCH) transmission, the collision probability is highly correlated to the RS pool size, as shown in FIG. 1. As shown therein, and for a legacy preamble pool size, the RS collision probability for 4 UEs is close to 10%, making the operating point hard to reach. Moreover, since the preamble pool size for contention based transmission would be likely to be smaller than the total number of defined preambles, e.g., 64, the actual collision probability may be even higher. Some techniques for reducing the collision probability include:

reference signal (RS) spreading techniques to increase the pool size, thereby reducing the collision probability, and receiver-side operations in the event that one of the colliding UE are decoded may include channel re-estimation based on the data of the decoded UE and subsequent interference cancellation.

However, both these techniques come at a cost of increased RS overhead/channel estimation accuracy or increased receiver complexity/modified receiver structure. For example, an increase to 24 demodulation reference signal (DMRS) ports with additional DMRS signals would potentially (a) decrease the code rate of the PUSCH, impacting the demodulation and decoding performance, and (b) lead to a channel estimation accuracy degradation in case of highly fluctuating channel states. Furthermore, the interference cancellation process is not the default operation for the base station and data-aided channel estimation would lead to complexity and memory increases.

Figure 2:
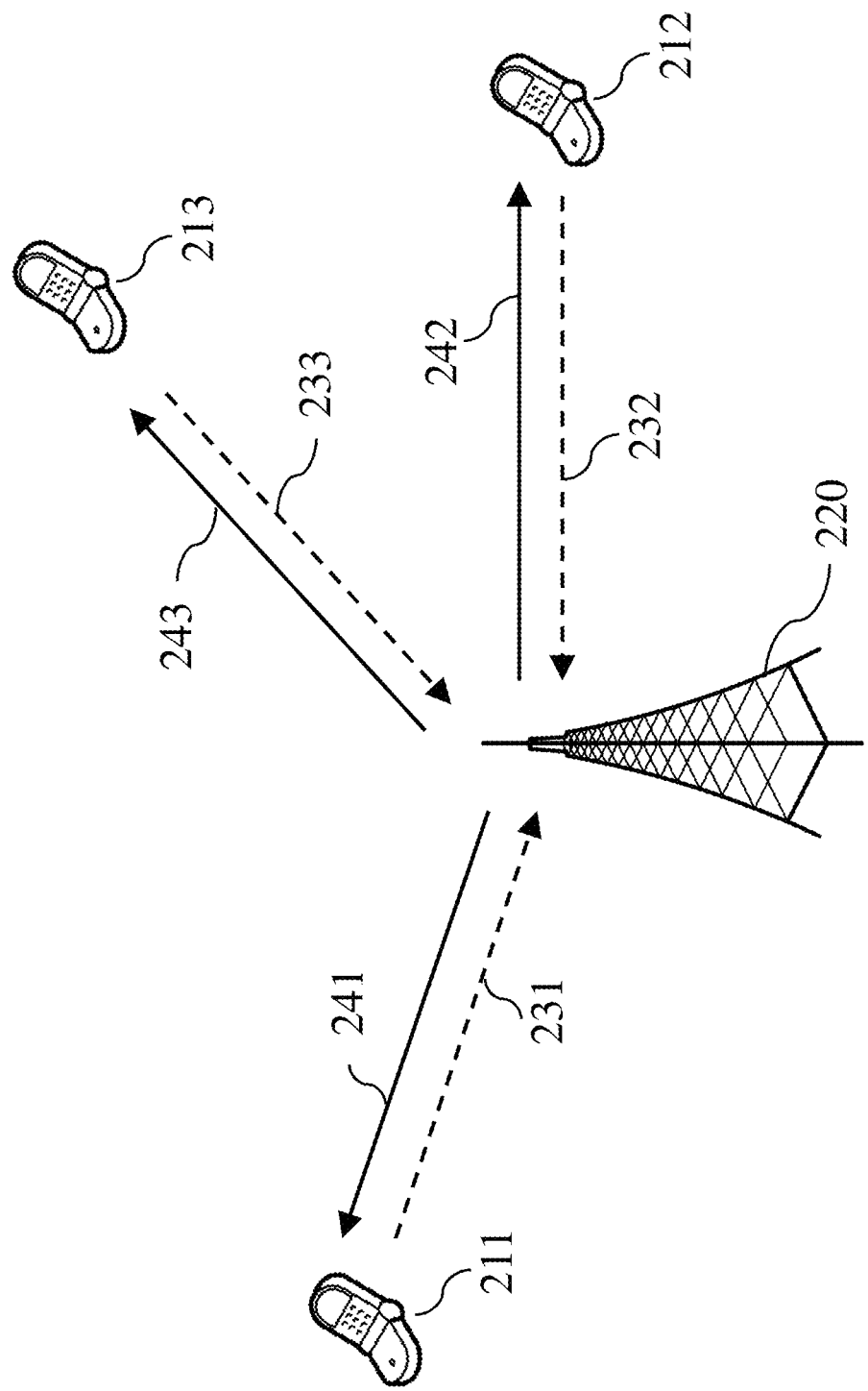
FIG. 2 shows an example of a base station (BS) and user equipment (UE) in wireless communication, in accordance with some embodiments of the presently disclosed technology.

FIG. 2 shows an example of a wireless communication system (e.g., an LTE, 5G or New Radio (NR) cellular network) that includes a BS 220 and one or more user equipment (UE) 211, 212 and 213. In some embodiments, the uplink transmissions (231, 232, 233) include payload transmission that have been differentially modulated as described by the presently disclosed technology. Subsequent downlink communications (241, 242, 243) from the BS 220 may be performed after the initial uplink payload transmissions. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Nomenclature for Embodiments of the Disclosed Technology

In the drawings, the descriptions, and the claims of this document the following terminology is adopted. In some embodiments, a "beam" may be interpreted as channel property assumption, quasi-co-location (QCL) state, transmission configuration indicator (TCI) state, spatial relation state (also called as spatial relation information state), a reference signal (RS), a RS set, a spatial filter or a precoding matrix. For example, A "Tx beam" may be a channel property assumption, QCL state, RS set, TCI state, spatial relation state, DL/UL reference signal (such as a channel state information reference signal (CSI-RS), synchronization signal block (SSB) (which is also called as SS/PBCH), demodulation reference signal (DMRS), sounding reference signal (SRS)), a Tx spatial filter or a Tx precoding matrix.

An "Rx beam" may be a channel property assumption, QCL state, RS set, TCI state, spatial relation state, spatial filter, an Rx spatial filter or Rx precoding.

A "beam ID" may be interpreted as a channel property assumption index, QCL state index, RS set, TCI state index, spatial relation state index, reference signalling index, a spatial filter index or a precoding index.

A "payload" may be interpreted as at least one of UE ID, user plane data, control plane data.

In some embodiments, the spatial filter may be either a UE-side filter or a gNB-side filter, and may also be referred to as a spatial-domain filter.

In some embodiments, "spatial relation information" is comprised of one or more reference RSs, which is used to represent "spatial relation" between targeted "RS or channel" and the one or more reference RSs, where "spatial relation" means the same/quasi-co beam, same spatial parameter, quasi-co spatial domain filter, or the same spatial domain filter.

In some embodiments, a "quasi-co-location (QCL) state" or "RS set" may include one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] spatial parameter. In some further embodiments, "QCL state" may be interpreted as "TCI state".

In some embodiments, the differential coding process makes the data to be transmitted to depend not only on the current signal state (or symbol), but also on the previous one. A differential coding implementation is based on a reference symbol and an operation, and includes applying the operation to the input data (or symbol) and the reference symbol. The term "differential modulation" may also be used to refer to the differential coding process, in both this and other documents.

EXEMPLARY EMBODIMENTS FOR CONTENTION-BASED PAYLOAD TRANSMISSIONS

Embodiment 1

In some embodiments, differential coding may be implemented on the transmitter-side for contention-based uplink PUSCH and PUCCH transmissions with both bit-level and symbol-level operations. For example, differential coding can be applied at the transmitter to the payload and the UE ID is included in the payload in either an explicit or an implicit manner. An example of explicit inclusion includes encoding and modulating the UE ID/beam ID bits, RNTI or other bits under predefined mapping rules to UE ID/beam ID bits. An example of implicit inclusion includes scrambling the CRC bits with the UE ID/beam ID bits, RNTI or other bits under predefined mapping rule to UE ID/beam ID bits.

Symbol-Level Implementation.

Figure 3A:
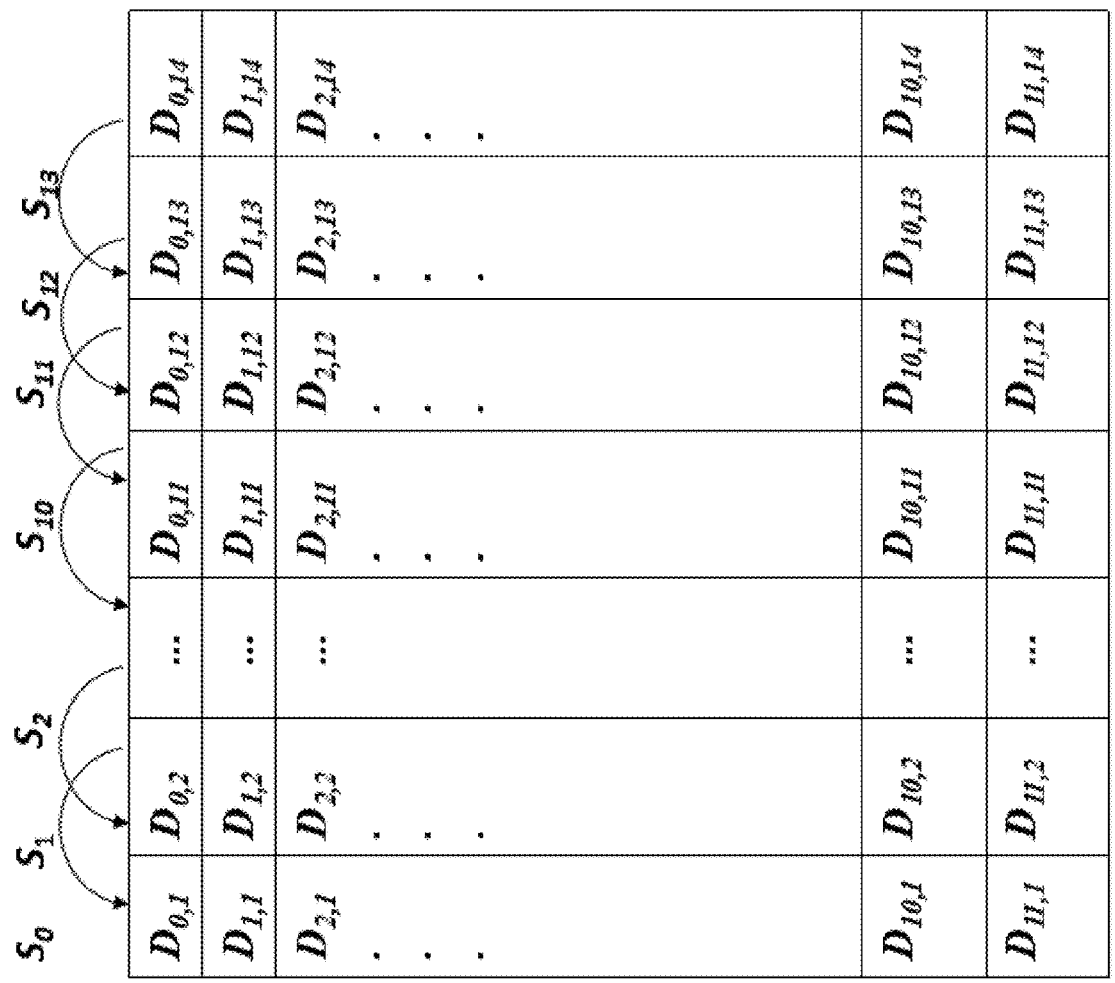
FIGS. 3A and 3B show examples of orthogonal frequency division multiplexing (OFDM) symbol-level and subcarrier-level differential coding, respectively.

In some embodiments, the payload is first modulated using an amplitude-keying or phase-keying modulation (e.g., QPSK) to transform the encoded bits into modulated symbols. Then, the modulated symbols $s_{m,n}$, where m is the index of the subcarrier and n is the index of the OFDM symbol in a given resource block, are transformed into transmit symbols $D_{m,n}$ using complex multiplication/division operations, as shown in FIG. 3A, where a reference OFDM symbol is the adjacent previous symbol. Specifically, the transmit symbols are computed using the equation:

$$D_{m,i+1} = D_{m,i} \cdot s_{m,i}.$$

Herein, i is the index of the OFDM symbol. In an example, the initial reference symbol could occupy the original DMRS position, e.g., the first OFDM symbol in a given resource block (RB). This kind of differential coding is often referred to as OFDM symbol-level differential coding.

Figure 3B:
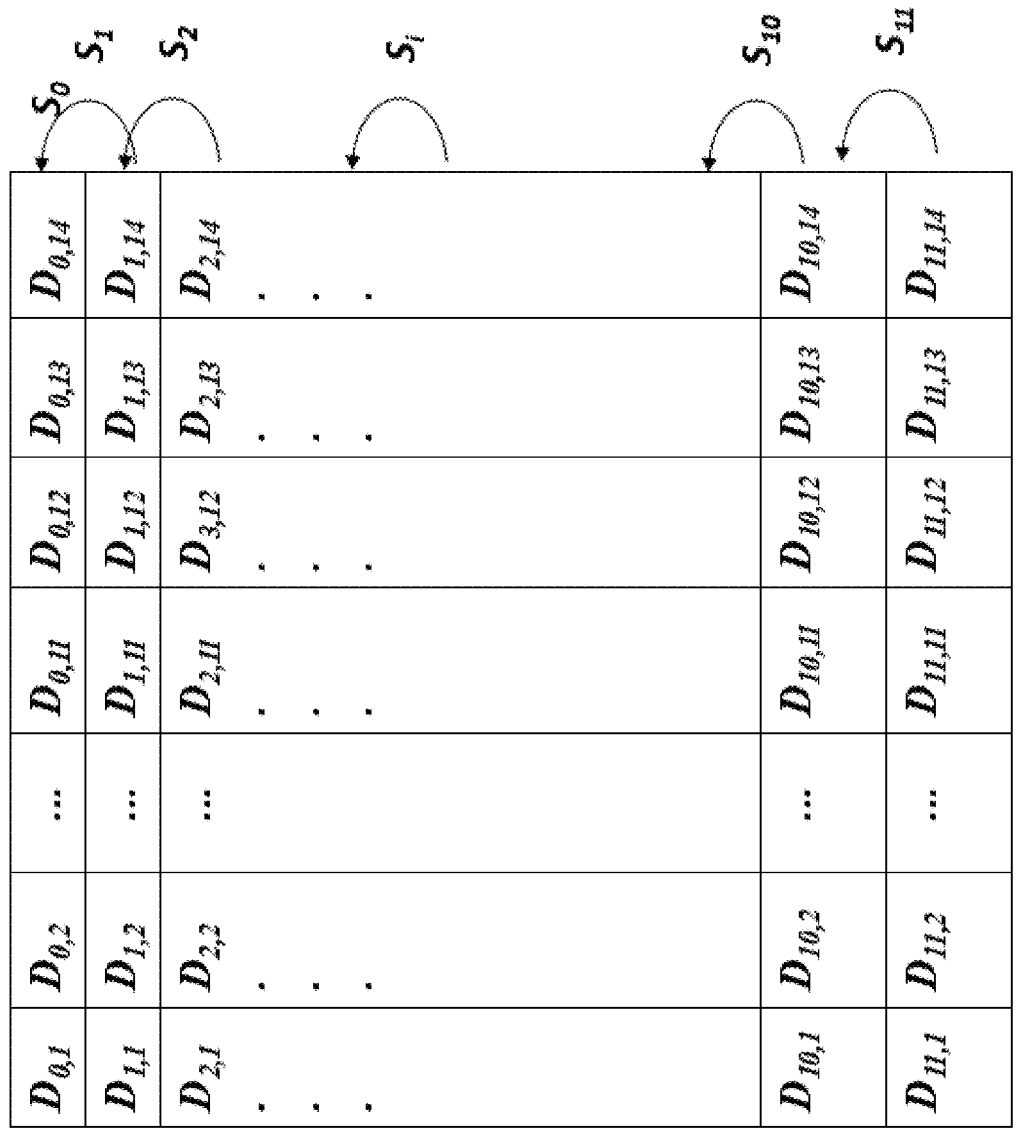

Another variant is termed subcarrier-level differential coding, as shown in FIG. 3B. The transmit symbols for the subcarrier-level differential coding are computed using the equation:

$$D_{m+1,i} = D_{m,i} \cdot s_{m+1,i}.$$

Figure 4A:
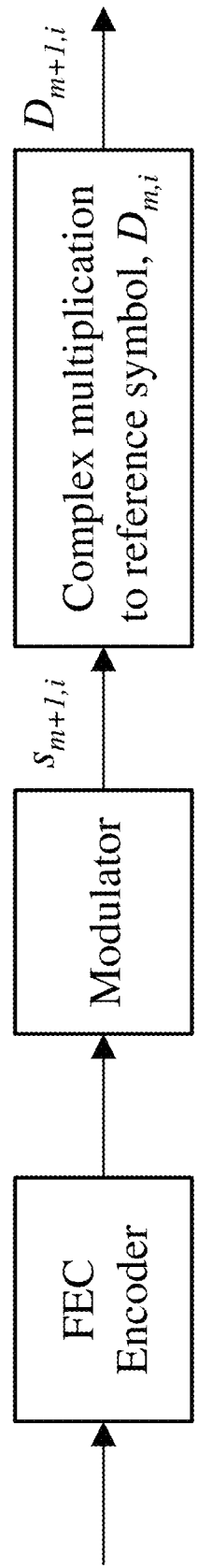
FIGS. 4A and 4B show examples of bit-level and symbol-level implementations of differential coding, respectively.

FIG. 4A shows an example of the transmitter-side block diagram for a symbol-level implementation of differential coding. In some embodiments, the reference symbol or subcarrier could be further constrained to a single resource element (RE) or be multiple REs occupying multiple OFDM symbols or subcarriers. Correspondingly, the differential coding is done at both the subcarrier and symbol level.

Bit-Level Implementation.

In some embodiments, and for binary phase shift keying (BPSK) modulation, differential coding may be performed at the bit level. First, some bits are transformed to modulated symbols using the mapping $0 \rightarrow (1+i)/\sqrt{2}$ and $1 \rightarrow (-1-i)/\sqrt{2}$ in order to establish certain reference bits (sets), e.g. $b_0$. Then the message to be transmitted, denoted $c_i$, may be used to perform modulo-2 addition using the reference bits (sets), i.e. the adjacent bits (sets) to obtain $b_{i+1}$, as follows:

$$b_{i+1} = (b_i + c_i) \mod 2, \ i = 0, 1, 2,$$

Figure 4B:
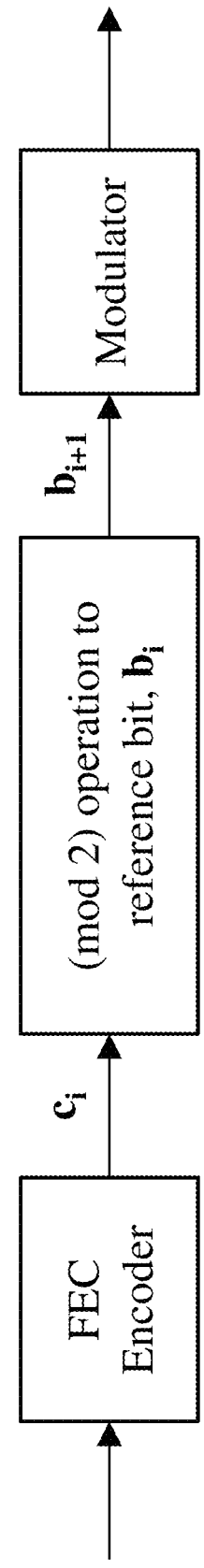

The computed bits $b_i$ may then be fed to the BPSK or pi/2-BPSK modulator to obtain transmit symbols. FIG. 4B shows an example of the transmitter-side block diagram for a bit-level implementation of differential coding.

In some embodiments, the differential coding process may be applied to the 2-step RACH procedure, and the payload may include a radio network temporary identifier (RNTI), the identity of the wireless device (e.g., UE ID), an establishment cause, uplink control information (UCI) or beam information.

On the receiver side, blind detection and decoding may be used to decode the PUSCH or PUCCH by first combining the signals received on the multiple antennas. In an example, the beam used for combining could loop through a predefined beam pool.

Embodiment 2

In some embodiments, differential coding may be implemented in conjunction with spreading on the transmitter-side for contention-based uplink PUSCH and PUCCH transmissions. In an example, the spreading operation may be performed as follows. It is assumed that the k-th transmit symbol is $s_k$, and spreading with a spreading code of length $L \geq 1$ is performed as:

$$s_k \times [C_{k1}, C_{k2}, \ldots, C_{kL}] = [s_k C_{k1}, s_k C_{k2}, \ldots, s_k C_{kL}].$$

In some embodiments, the transmitted data may include the information associated with the spreading code (e.g., the index of the spreading code in a code set, information related to the generation of the spreading code). If the transmitted data includes the information of the spreading code or the index of the spreading code in a code set or the information of the generation of the spreading code, the spreading code can be used to make a precise reconstruction of the spread data symbols and assist the blind detection procedure.

For example, differential coding can be applied at the transmitter to the payload and the UE ID is included in the payload in either an explicit or an implicit manner. An example of explicit inclusion includes encoding and modulating the UE ID/beam ID bits, RNTI or other bits under predefined mapping rules to UE ID/beam ID bits. An example of implicit inclusion includes scrambling the CRC bits with the UE ID/beam ID bits, RNTI or other bits under predefined mapping rule to UE ID/beam ID bits.

In some embodiments, the modulated symbols that have been differentially coded may be generated by performing complex multiplication/division on two adjacent OFDM symbols. In an example, the initial reference symbol could occupy the original DMRS position, e.g., the first OFDM symbol in a given subframe.

In some embodiments, the differential coding process may be applied to the 2-step RACH procedure, and the payload may include a radio network temporary identifier (RNTI), the identity of the wireless device (e.g., UE ID), an establishment cause, uplink control information (UCI) or beam information.

Figure 5A:
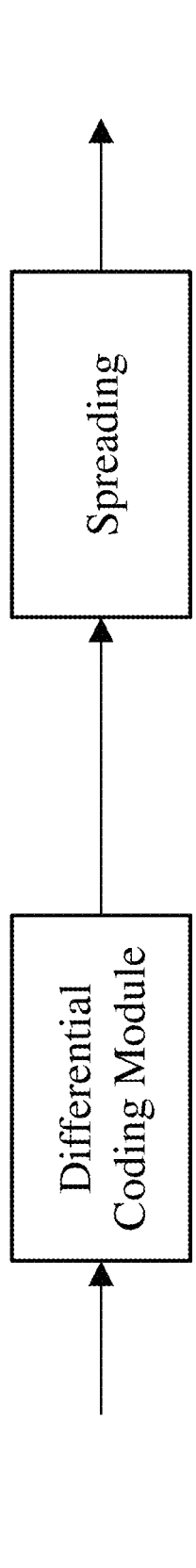
FIGS. 5A and 5B show examples of combined spreading and differential coding.
Figure 5B:
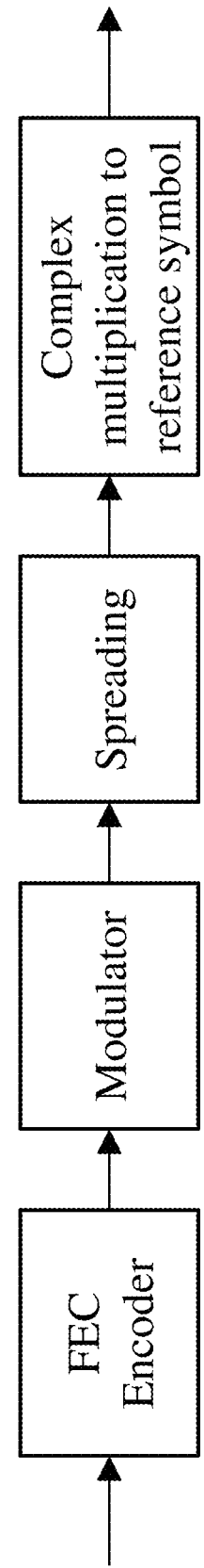

In some embodiments, the spreading operation may be performed either after the differential coding process or before the differential coding operation, as illustrated in FIGS. 5A and 5B, respectively.

Embodiment 3

In some embodiments, differential coding may be implemented in conjunction with higher-order modulations on the transmitter-side for contention-based uplink PUSCH and PUCCH transmissions. For example, differential coding can be applied at the transmitter to the payload and the UE ID is included in the payload in either an explicit or an implicit manner. An example of explicit inclusion includes encoding and modulating the UE ID/beam ID bits, RNTI or other bits under predefined mapping rules to UE ID/beam ID bits. An example of implicit inclusion includes scrambling the CRC bits with the UE ID/beam ID bits, RNTI or other bits under predefined mapping rule to UE ID/beam ID bits.

Symbol-Level Implementation.

In some embodiments, the payload is first modulated using an amplitude-keying or phase-keying modulation (e.g., QPSK) to transform the encoded bits into modulated symbols. Then, the modulated symbols $s_{m,n}$, where m is the index of the subcarrier and n is the index of the OFDM symbol in a given resource block, are transformed into transmit symbols $D_{m,n}$ using complex multiplication/division operations, as shown in FIG. 3A, where a reference OFDM symbol is the adjacent previous symbol. Specifically, the transmit symbols are computed using the equation:

$$D_{m,i+1} = D_{m,i} \cdot s_{m,i}.$$

Figure 6:
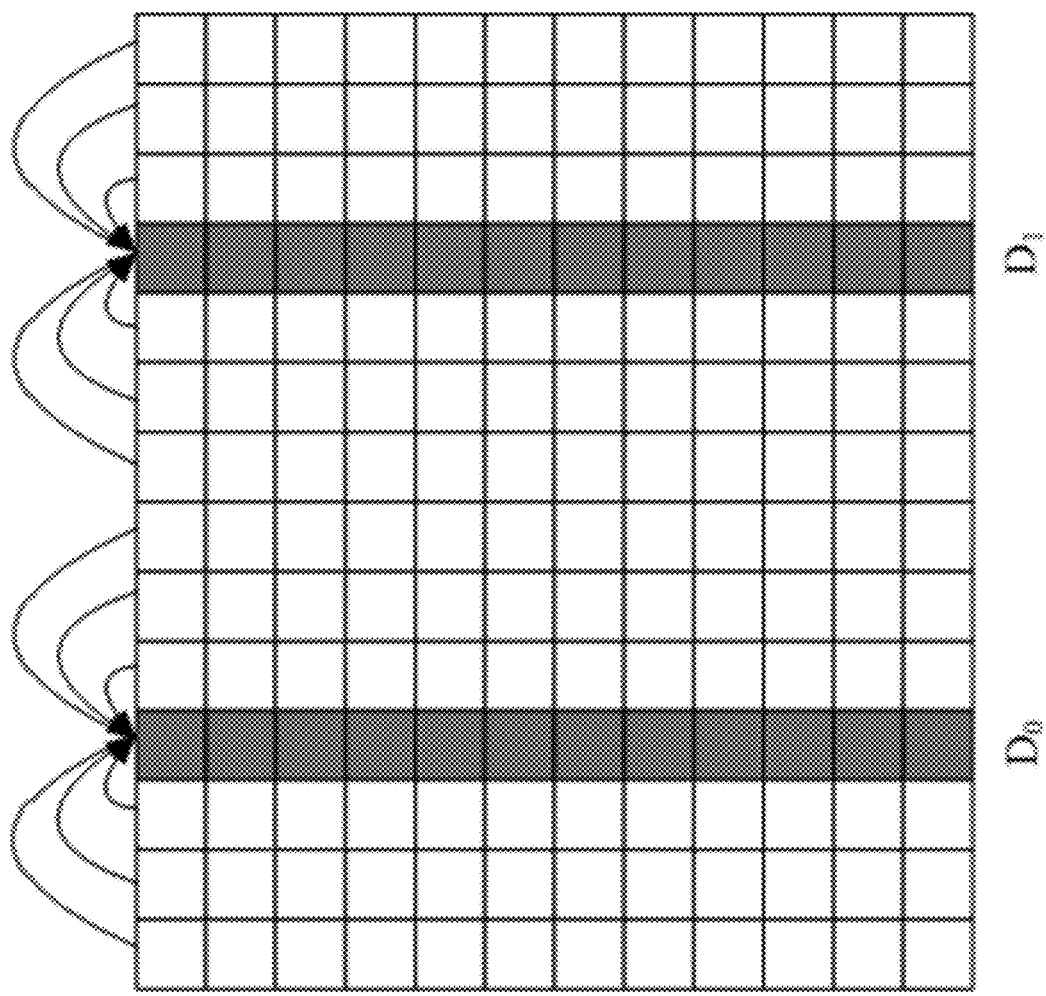
FIG. 6 shows an example of multiple reference symbols for differential coding.

Herein, i is the index of the OFDM symbol. In some embodiments, the initial reference symbols, e.g., $D_0$ and $D_1$, may occupy the LTE DMRS positions. For example, the $4^{th}$ and the $11^{th}$ OFDM symbols in a given transmission time interval (TTI), and as illustrated in FIG. 6 may be the reference symbols. The elements of the reference symbols could be chosen from a certain set, e.g., $\{1, -1, i, -i\}$ or the Zadoff-Chu (ZC) sequence, considering the efficiency of computation. As shown in FIG. 6, the transmit symbols $\{1, 2, 3, 5, 6, 7\}$ take the $4^{th}$ symbol as the reference symbol and transmit symbols $\{8, 9, 10, 12, 13, 14\}$ could take the $11^{th}$ symbol as the reference symbol. Likewise, the subcarrier-level differential coding could also be performed, for example, assuming the 2 middle subcarriers are used to place the reference symbols.

Embodiment 4

In some embodiments, beam determination in contention-based uplink PUSCH or PUCCH transmissions may be performed in a blind manner. In an example, beam determination in a contention-based uplink PUSCH could be performed in a blind manner by looping through a pre-defined beam pool.

Examples of pre-defined beam pools, in the case of 4 antenna ports and 2 antenna ports, are shown in Table 1, Table 2 and Table 3, respectively. In some embodiments, and to alleviate decoding efforts, the streams with the larger post-SINR could be fed to the FEC decoder.

TABLE 1

Example of beam vectors for 4 receive antenna ports

| Beam Index | Beam Vector $v_4 \in C^{1\times 4}$ | | | |
|---|---|---|---|---|
| 1  | 1 | 1  | 0  | 0  |
| 2  | 1 | −1 | 0  | 0  |
| 3  | 1 | 0  | 1  | 0  |
| 4  | 1 | 0  | −1 | 0  |
| 5  | 1 | 0  | 0  | 1  |
| 6  | 1 | 0  | 0  | −1 |
| 7  | 0 | 1  | 1  | 0  |
| 8  | 0 | 1  | −1 | 0  |
| 9  | 0 | 1  | 0  | 1  |
| 10 | 0 | 1  | 0  | −1 |
| 11 | 0 | 0  | 1  | 1  |
| 12 | 0 | 0  | 1  | −1 |
| 13 | 1 | i  | 0  | 0  |
| 14 | 1 | −i | 0  | 0  |
| 15 | 1 | 0  | i  | 0  |
| 16 | 1 | 0  | −i | 0  |
| 17 | 1 | 0  | 0  | i  |
| 18 | 1 | 0  | 0  | −i |
| 19 | 0 | 1  | i  | 0  |
| 20 | 0 | 1  | −i | 0  |
| 21 | 0 | 1  | 0  | i  |
| 22 | 0 | 1  | 0  | −i |
| 23 | 0 | 0  | 1  | i  |
| 24 | 0 | 0  | 1  | −i |

TABLE 2

Example of beam vectors for 4 receive antenna ports

| Beam Index | Beam Vector $v_4 \in C^{1\times 4}$ | | | |
|---|---|---|---|---|
| 1  | 1 | 1  | 1  | 1  |
| 2  | 1 | −1 | 1  | −1 |
| 3  | 1 | 1  | −1 | −1 |
| 4  | 1 | −1 | −1 | 1  |
| 5  | 1 | −i | −i | 1  |
| 6  | 1 | i  | i  | −1 |
| 7  | 1 | −i | −i | −1 |
| 8  | 1 | i  | −i | 1  |
| 9  | 1 | −1 | −i | −i |
| 10 | 1 | 1  | −i | i  |
| 11 | 1 | −1 | i  | i  |
| 12 | 1 | 1  | i  | −i |
| 13 | 1 | i  | −1 | i  |
| 14 | 1 | −i | −1 | −i |
| 15 | 1 | i  | 1  | −i |
| 16 | 1 | −i | 1  | i  |

TABLE 3

Example of beam vectors for 2 receive antenna ports

| Beam Index | Beam Vector $v_2 \in C^{1\times 2}$ | |
|---|---|---|
| 1 | 1 | 0 |
| 2 | 0 | 1 |
| 3 | 1 | 1 |
| 4 | 1 | −1 |

TABLE 3-continued

Example of beam vectors for 2 receive antenna ports

| Beam Index | Beam Vector $v_2 \in C^{1\times 2}$ | |
|---|---|---|
| 5 | 1 | i |
| 6 | 1 | −i |

Embodiment 5

In some embodiments, beam determination in contention-based uplink PUSCH or PUCCH transmissions may include acknowledging the beam information. For example, a synchronization signal block (SSB) index could be mapped to payload transmission occasions and the ordering of this mapping relationship could be first using the time-domain resource index, and then using the frequency-domain resource index.

An example of the SSB to payload occasion mapping may be:

| SSB1 | SSB2 | SSB3 | SSB4 | SSB5 | SSB6 | SSB7 | SSB8 |
|---|---|---|---|---|---|---|---|
| SSB1 | SSB2 | SSB3 | SSB4 | SSB5 | SSB6 | SSB7 | SSB8 |
| SSB1 | SSB2 | SSB3 | SSB4 | SSB5 | SSB6 | SSB7 | SSB8 |
| SSB1 | SSB2 | SSB3 | SSB4 | SSB5 | SSB6 | SSB7 | SSB8 |

Another example of the SSB to payload occasion mapping may be:

| SSB4 | SSB8 | SSB4 | SSB8 | SSB4 | SSB8 | SSB4 | SSB8 |
|---|---|---|---|---|---|---|---|
| SSB3 | SSB7 | SSB3 | SSB7 | SSB3 | SSB7 | SSB3 | SSB7 |
| SSB2 | SSB6 | SSB2 | SSB6 | SSB2 | SSB6 | SSB2 | SSB6 |
| SSB1 | SSB5 | SSB1 | SSB5 | SSB1 | SSB5 | SSB1 | SSB5 |

Once a payload occasion is detected, the SSB info will be used by the base station to perform receive beamforming. However, the receive beamformer may not be as effective as expected for subsequent downlink transmissions due to multi-user interference. Thus, the RSRP measurements or beam index (e.g., the index of the downlink beams with stronger RSRP values transmitted by the base station and acquired by the UE) can be transmitted to the base station (e.g., network node, gNB, eNB) for subsequent downlink transmissions, in particular for the cases that include more than 4 antenna ports and when DL/UL reciprocity exists.

Embodiment 6

Figure 7A:
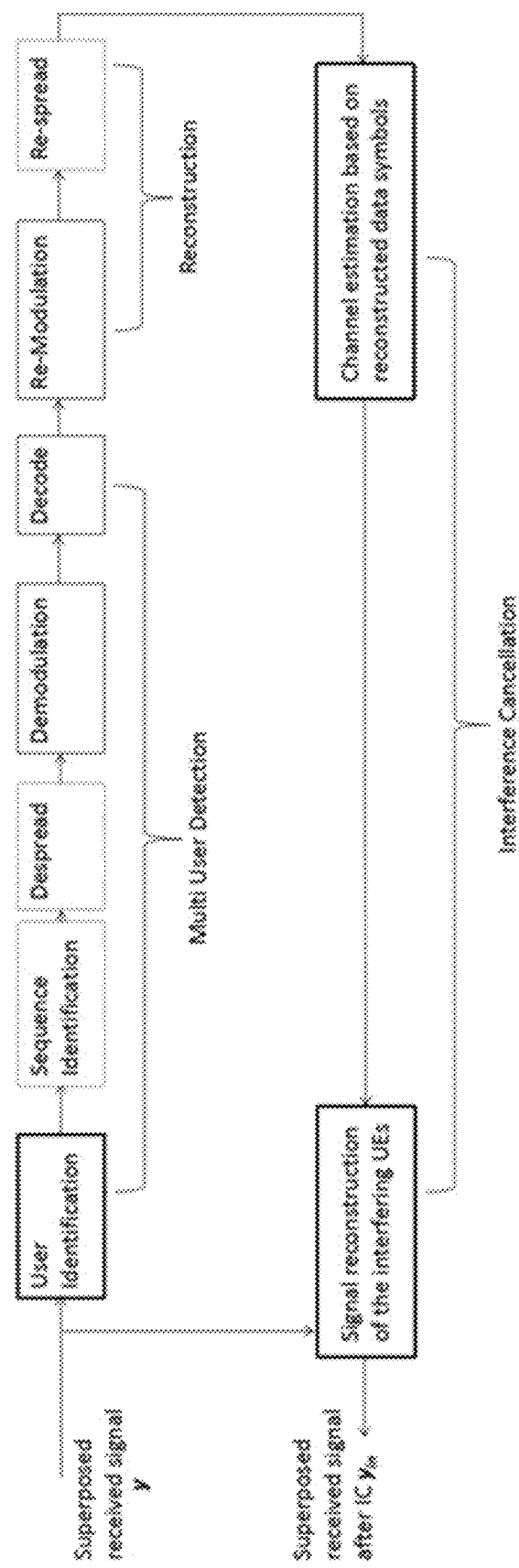
FIGS. 7A and 7B show examples of receiver processing for systems with combined spreading and differential coding.
Figure 7B:
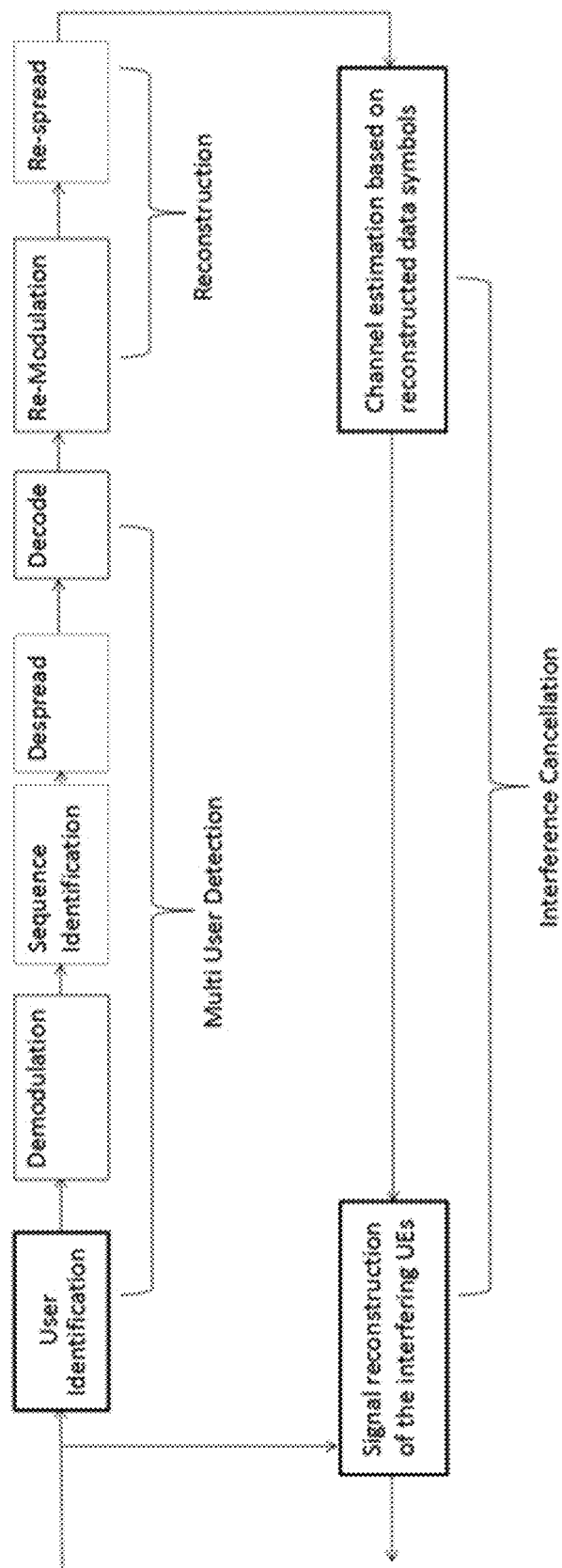

In some embodiments, and with differential coding at the transmitter side, advanced receivers with interference cancellation capabilities could be configured to further improve the detection performance. For example, the receiver structures shown in FIGS. 7A and 7B may be used to in these described embodiments.

In some embodiments, and if spreading is not implemented on the transmitter-side, de-spreading operations at the receiver are disabled. In this scenario, user identification could be based the preamble, e.g. for msg3 UL data transmission or based on the payload itself, and further based on certain criteria at the receiver in case of blind detection. For the demodulation step, the operations implemented therein may include a complex multiplication or division of adjacent modulated symbols (e.g. multiplying the conjugate of a certain symbol by the other adjacent one). In an example, the interference cancellation is based on a channel estimated from the modulated symbols.

In some embodiments, and if spreading is implemented on the transmitter-side before differential coding, the receiver processing must perform demodulation prior to de-spreading. In the case of blind detection, the de-spreading sequence range could be further narrowed down by implementing a process called sequence identification.

In some embodiments, and if spreading is implemented on the transmitter-side after differential coding, the receiver processing must perform de-spreading prior to demodulation. In the case of blind detection, the de-spreading sequence range could be further narrowed down by implementing a process called sequence identification.

Exemplary Methods for the Disclosed Technology

Embodiments of the disclosed technology advantageously result in a lower collision probability in the one-shot/contention-based uplink payload transmission.

Figures 8, 9:
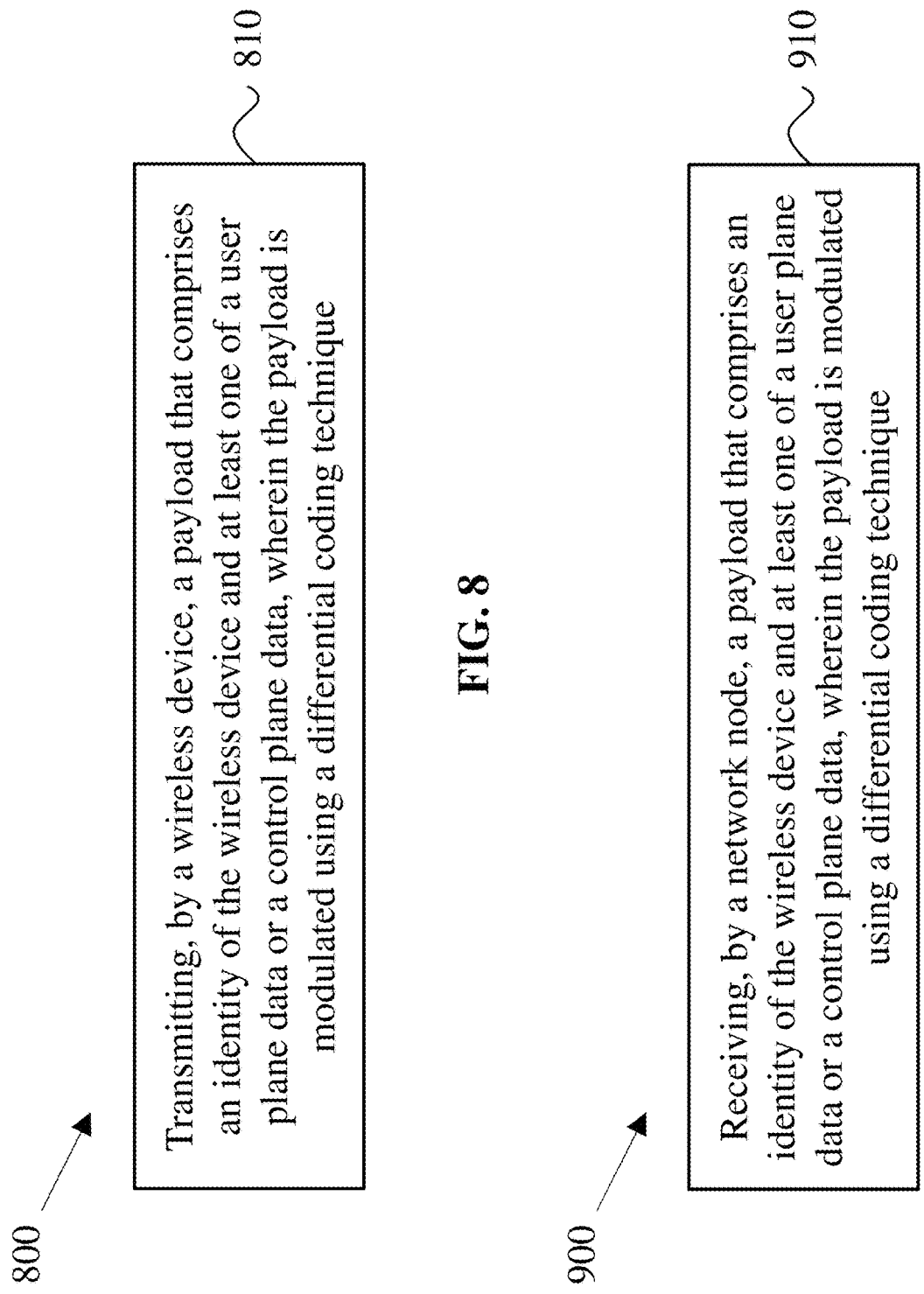
FIG. 8 shows a flowchart for an exemplary wireless communication method.
FIG. 9 shows a flowchart for another exemplary wireless communication method.

FIG. 8 shows an example of a wireless communication method 800 for contention-based payload transmissions using differential coding techniques. The method 800 includes, at step 810, transmitting, by a wireless device, a payload that comprises an identity of the wireless device and at least one of a user plane data or a control plane data, where the payload is modulated using a differential coding technique.

In some embodiments, the wireless device is in a radio resource control (RRC) inactive state or RRC idle state, and wherein the payload comprises the identity of the wireless device and the user plane data.

FIG. 9 shows an example of a wireless communication method 900 for contention-based payload transmissions using differential coding techniques. This example includes some features and/or steps that are similar to those shown in FIG. 8, and described above. At least some of these features and/or steps may not be separately described in this section.

The method 900 includes, at step 910, receiving, by a network node, a payload that comprises an identity of the wireless device and at least one of a user plane data or a control plane data, where the payload is modulated using a differential coding technique.

In some embodiments, the methods 800 and 900 may further include the steps of encoding a plurality of data symbols to generate a plurality of encoded symbols, differentially coding the plurality of encoded symbols to generate a plurality of differentially coded symbols, and generating, using an amplitude-shift keying (ASK) or phase-shift keying (PSK) modulation, the payload based on the plurality of differentially coded symbols. In an example, the ASK or PSK modulation comprises binary phase shift keying (BPSK), π/2-BPSK or quadrature phase shift keying (QPSK).

In some embodiments, the methods 800 and 900 may further include the steps of encoding a plurality of data symbols to generate a plurality of encoded symbols, generating, using an amplitude-shift keying or phase-shift keying modulation, a plurality of modulated symbols, and generating the payload by differentially coding the plurality of modulated symbols. In an example, generating the plurality of modulated symbols is based on a higher order modulation, and the differential coding technique uses multiple reference symbols. In another example, the higher order modulation is 16-QAM (quadrature amplitude modulation). In yet another example, the payload spans a transmission time interval (TTI) with multiple orthogonal frequency division multiplexing (OFDM) symbols, wherein the multiple reference symbols comprise OFDM symbols located in Long-Term Evolution (LTE) Demodulation Reference Signal (DMRS) positions. In a specific example, and in the context of FIG. 6, the TTI comprises 14 OFDM symbols, the multiple reference symbols comprise two reference symbols that are located in a 4th OFDM symbol position and an 11th OFDM symbol position in the TTI, wherein the multiple reference symbols are selected from $\{1, -1, -i\}$, and wherein $i=\sqrt{-1}$.

In some embodiments, the payload comprises a random access (RACH) message. In an example, the RACH message comprises at least one of a radio network temporary identifier (RNTI), the identity of the wireless device, an establishment cause, uplink control information (UCI) or beam information. In other embodiments, the payload comprises an indication of one or more reference signal receive power (RSRP) measurements or beam information, and wherein the indication is explicit or implicit.

In some embodiments, the methods 800 and 900 may further include the steps of spreading a plurality of input symbols to produce a plurality of spread symbols, and generating the payload by differentially coding the plurality of spread symbols.

In some embodiments, the methods 800 and 900 may further include the steps of differentially coding a plurality of input symbols to produce a plurality of differentially coded symbols, and generating the payload by spreading the plurality of differentially coded symbols.

Implementations for the Disclosed Technology

Figure 10:
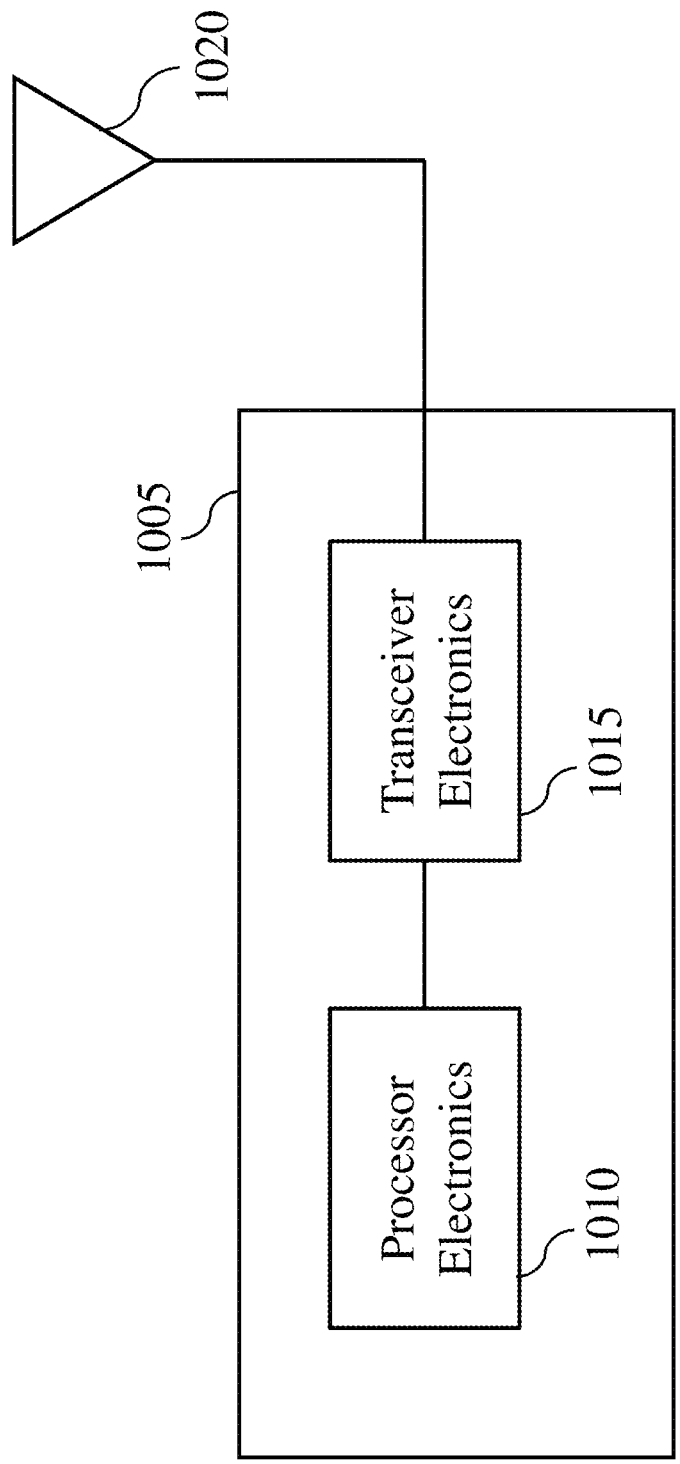
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   transmitting, by a wireless device to a network node, a payload that comprises an identity of the wireless device and at least one of a user plane data or a control plane data, the payload being a contention-based uplink payload,
   wherein the payload is modulated using a differential coding technique,
   wherein a payload transmission occasion associated with the payload is mapped to a synchronization signal block (SSB) index based on a mapping relationship that is ordered first based on a time-domain resource index and then a frequency-domain resource index.

2. The method of claim 1, further comprising:
   encoding a plurality of data symbols to generate a plurality of encoded symbols.

3. The method of claim 2, further comprising:
   differentially coding the plurality of encoded symbols to generate a plurality of differentially coded symbols; and
   generating, using an amplitude-shift keying (ASK) or phase-shift keying (PSK) modulation, the payload based on the plurality of differentially coded symbols.

4. The method of claim 3, wherein the ASK or PSK modulation comprises binary phase shift keying (BPSK), $\pi/2$-BPSK or quadrature phase shift keying (QPSK).

5. The method of claim 2, further comprising:
   generating, using an amplitude-shift keying or phase-shift keying modulation, a plurality of modulated symbols; and
   generating the payload by differentially coding the plurality of modulated symbols.

6. The method of claim 5, wherein generating the plurality of modulated symbols is based on a higher order modulation, and wherein the differential coding technique uses multiple reference symbols.

7. The method of claim 6, wherein the higher order modulation is 16-QAM (quadrature amplitude modulation).

8. The method of claim 6, wherein the payload spans a transmission time interval (TTI) with multiple orthogonal frequency division multiplexing (OFDM) symbols, wherein the multiple reference symbols comprise OFDM symbols located in Long-Term Evolution (LTE) Demodulation Reference Signal (DMRS) positions.

9. The method of claim 8, wherein the TTI comprises 14 OFDM symbols, the multiple reference symbols comprise two reference symbols that are located in a 4th OFDM symbol position and an 11th OFDM symbol position in the TTI, wherein the multiple reference symbols are selected from $\{1, -1, i, -i\}$, and wherein $i=\sqrt{-1}$.

10. The method of claim 1, wherein the payload comprises a random access (RACH) message.

11. The method of claim 10, wherein the RACH message comprises at least one of a radio network temporary identifier (RNTI), the identity of the wireless device, an establishment cause, uplink control information (UCI) or beam information.

12. The method of claim 1, wherein the wireless device is in a radio resource control (RRC) inactive state or an RRC idle state, and wherein the payload comprises the identity of the wireless device and the user plane data.

13. The method of claim 1, wherein the payload comprises an indication of one or more reference signal receive power (RSRP) measurements or beam information, and wherein the indication is explicit or implicit.

14. A method for wireless communication, comprising:
    receiving, by a network node from a wireless device, a payload that comprises an identity of the wireless device and at least one of a user plane data or a control plane data, the payload being a contention-based uplink payload,
    wherein the payload is modulated using a differential coding technique,
    wherein a payload transmission occasion associated with the payload is mapped to a synchronization signal block (SSB) index based on a mapping relationship that is ordered first based on a time-domain resource index and then a frequency-domain resource index.

15. The method of claim 14, wherein the wireless device is in a radio resource control (RRC) inactive state or an RRC idle state, and wherein the payload comprises the identity of the wireless device and the user plane data.

16. The method of claim 14, wherein the payload comprises an indication of one or more reference signal receive power (RSRP) measurements or beam information, and wherein the indication is explicit or implicit.

17. The method of claim 14, further comprising:
spreading a plurality of input symbols to produce a plurality of spread symbols; and
generating the payload by differentially coding the plurality of spread symbols.

18. The method of claim 14, further comprising:
differentially coding a plurality of input symbols to produce a plurality of differentially coded symbols; and
generating the payload by spreading the plurality of differentially coded symbols.

19. The method of claim 14, wherein the payload comprises a random access (RACH) message.

20. The method of claim 19, wherein the RACH message comprises at least one of a radio network temporary identifier (RNTI), the identity of the wireless device, an establishment cause, uplink control information (UCI) or beam information.

* * * * *